US007131197B1

(12) United States Patent
Biro

(10) Patent No.: US 7,131,197 B1
(45) Date of Patent: Nov. 7, 2006

(54) ENGINE SEAL INSTALLING TOOL

(76) Inventor: Andor B. Biro, 1710 Madison St. Apt. 1 L, Ridgewood, NY (US) 11385

( * ) Notice: Subject to any disclaimer, the term of this patent is extended or adjusted under 35 U.S.C. 154(b) by 134 days.

(21) Appl. No.: 10/789,614

(22) Filed: Feb. 27, 2004

(51) Int. Cl.
*B21K 53/84* (2006.01)
*B23O 3/00* (2006.01)

(52) U.S. Cl. ........................................ 29/888.3; 29/464

(58) Field of Classification Search .................. 29/464, 29/428, 402.02, 525, 453, 235, 263, 898.08, 29/256, 888.3, 700, 213.1; 81/44
See application file for complete search history.

(56) References Cited

U.S. PATENT DOCUMENTS 2,621,398 A 12/1952 Simmons
3,490,131 A 1/1970 Sexton
5,539,979 A 7/1996 Powers
5,893,202 A * 4/1999 Graham et al. .......... 29/402.02

* cited by examiner

*Primary Examiner*—John C. Hong

(57) ABSTRACT

An engine seal installing tool, system and method for facilitating installation of engine seals in a simplified process includes a main screw engageable to an engine shaft. An engine seal is mounted on a seal guide assembly slidably mounted on the main screw. A pressure nut is used to urge the seal guide assembly towards the engine shaft to insert the engine seal into the seal housing surrounding the engine shaft.

12 Claims, 2 Drawing Sheets

ENGINE SEAL INSTALLING TOOL

BACKGROUND OF THE INVENTION

1. Field of the Invention

The present invention relates to seal installing tools and more particularly pertains to a new engine seal installing tool for facilitating installation of engine seals in a simplified two step process.

2. Description of the Prior Art

The use of seal installing tools is known in the prior art. U.S. Pat. No. 2,621,398 and U.S. Pat. No. 3,490,131 each disclose a device and method for installing an oil seal. U.S. Pat. No. 5,539,979 discloses a method and apparatus for repairing the rear seal area on the crankshaft of an internal combustion engine that uses a plurality of tool inserts.

While these devices fulfill their respective, particular objectives and requirements, the need remains for a device that more easily and efficiently installs a seal.

SUMMARY OF THE INVENTION

The present invention meets the needs presented above by providing a simple mechanical process to insert an engine seal into an engine.

An object of the present invention is to provide a new engine seal installing tool that self aligns the new engine seal with the seal housing.

Another object of the present invention is to provide a new engine seal installing tool that quickly inserts a new engine seal into the seal housing.

To this end, the present invention generally comprises a main screw portion attachable to the crankshaft or camshaft. A pressure nut is attached to the main screw and is used to urge a seal guide and seal mount along the main screw towards the seal housing until the seal is positioned in the seal housing. The seal remains in the seal housing upon withdrawal of the seal mount and the main screw is detached from the crankshaft or camshaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
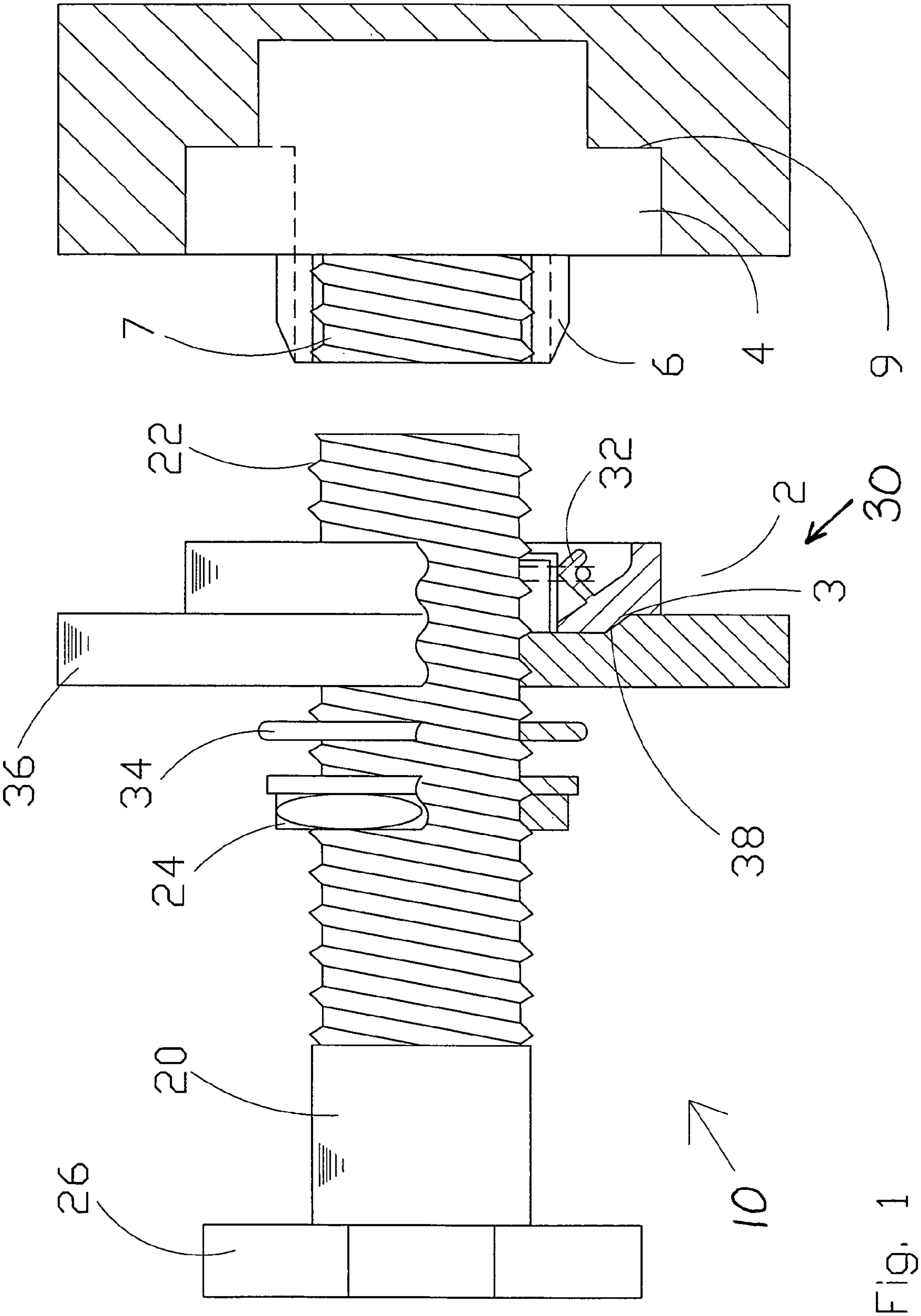
FIG. 1 is a partial cross-section side view of a new engine seal installing tool according to the present invention.
Figure 2:
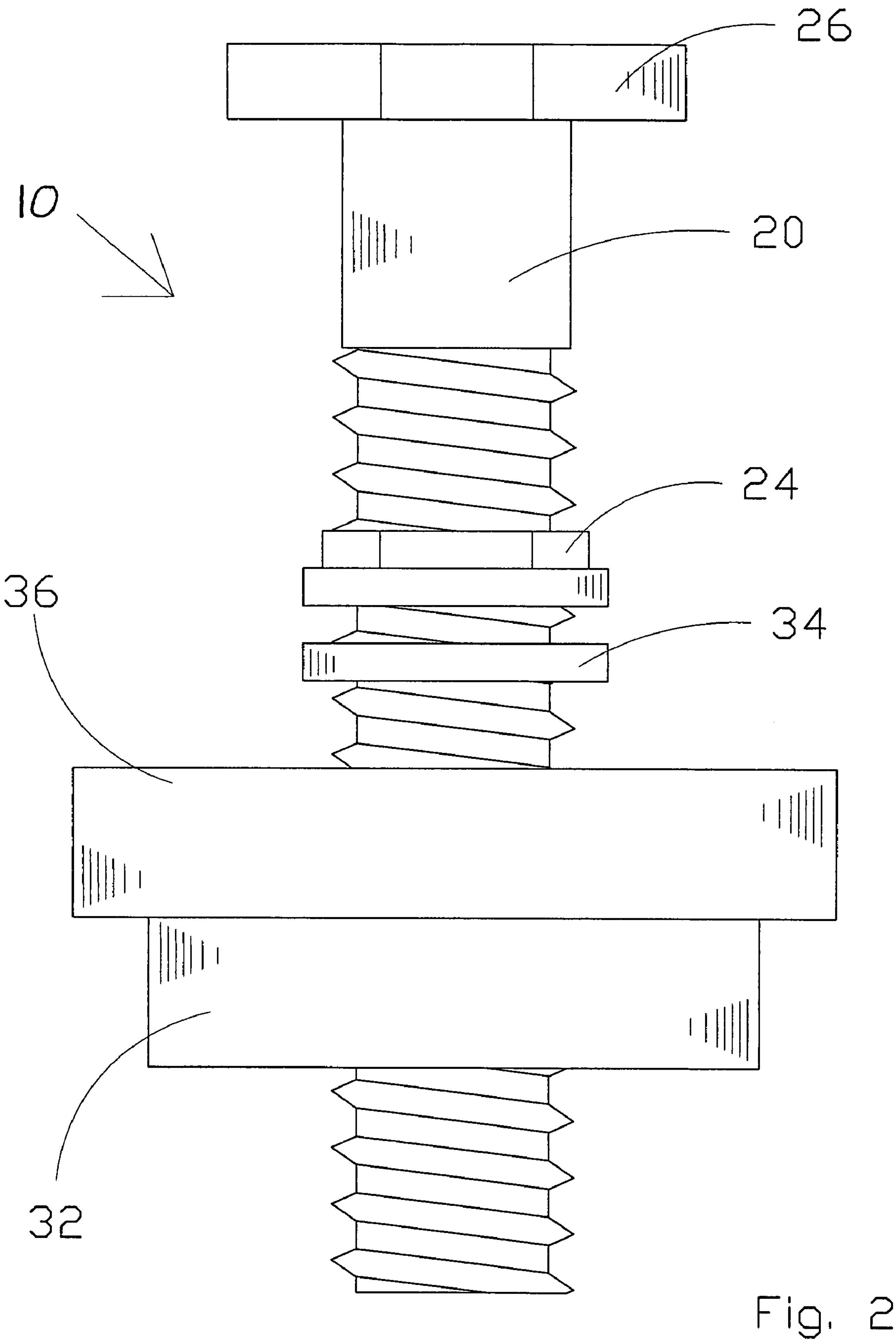
FIG. 2 is a side view of the present invention.

With reference now to the drawings, and in particular to FIGS. 1 and 2 thereof, a new engine seal installing tool embodying the principles and concepts of the present invention and generally designated by the reference numeral 10 will be described.

As best illustrated in FIGS. 1 and 2, the engine seal installing tool 10 for inserting an engine seal 2 into a seal housing 4 surrounding an engine shaft 6 generally comprises a main screw 20 having a distal end 22 designed for attachment to the engine shaft 6. A pressure nut 24 is attached to the main screw 20 and selectively movable along a length of the main screw 20 between a head portion 26 and the distal end 22. A seal guide assembly 30 is slidably inserted onto the main screw 20. The seal guide assembly 30 has a seal mount portion 32. The seal mount portion 32 is insertable through the engine seal 2 such that the engine seal 2 is mounted on the seal mount portion 32. The pressure nut 24 is movable against the seal guide assembly 30 to urge the seal guide assembly 30 towards the distal end 22. Thus, the engine seal 2 is delivered into the seal housing 4.

To facilitate operation, a washer 34 constructed of brass or copper is positioned between the pressure nut 24 and the seal guide assembly 30. The washer 34 may have a beveled circumferential edge surface.

The seal guide assembly 30 has a backing portion 36. The seal mount portion 32 is a cylindrical tube extending from the backing portion. The backing portion 36 has a diameter that is greater than a diameter of the seal mount portion 32, and also greater than a diameter or dimension of the cavity in the seal housing 4. Thus, the seal mount portion 32 is positionable to receive an end 8 of the engine shaft 6 such that the engine seal 2 is positioned in the seal housing 4. The seal mount portion 32 extends from the backing portion 36 a length less than a depth of the engine seal 2. Thus, the seal mount portion 32 is inhibited from abutting a back wall 9 of the seal housing 4 while inserting the engine seal 2 into the seal housing 4.

The backing portion 36 includes a groove 38 extending around a base 40 of the seal mount portion 32 such that the groove 38 is positioned to receive a protrusion 3 extending from the engine seal 2.

The main screw 20 includes threading complimentary to interior threading 7 of the engine shaft 6 whereby the main screw 20 is attachable to the engine shaft 6.

The method of use includes the following steps. The user requires an engine having an engine shaft and a seal housing surrounding an end of the engine shaft, an engine seal, and a seal installing tool as described above. The engine seal is mounted onto the seal mount portion. The main screw is attached to the engine shaft. The pressure nut is moved towards the engine shaft whereby the seal guide assembly is urged towards the engine to insert the engine seal into the seal housing. The seal guide assembly is retracted away from the engine and the engine seal is retained in the seal housing. The main screw is detached from the engine shaft.

It is preferable to move the pressure nut towards the head portion of the main screw to permit retraction of the seal guide assembly while the main screw remains attached to the engine shaft.

It is also preferable to move the pressure nut towards the engine shaft until the backing portion abuts the engine to indicate the engine seal is fully inserted into the seal housing.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seal installation tool for inserting an engine seal into a seal housing surrounding an engine shaft, said seal installation tool comprising:

a main screw having a distal end adapted for attachment to the engine shaft;

a pressure nut attached to said main screw and selectively movable along a length of said main screw between a head portion of the main screw and said distal end;

a seal guide assembly slidably inserted onto said main screw, said seal guide assembly having a seal mount portion, said seal mount portion being insertable through the engine seal such that the engine seal is mounted on said seal mount portion; and said pressure nut being movable against said seal guide assembly to urge said seal guide assembly towards said distal end whereby the engine seal is delivered into the seal housing;

wherein said main screw includes threading complimentary to interior threading of the engine shaft whereby said main screw is attachable to the engine shaft.

2. The seal installation tool of claim 1, further comprising:

a washer positioned between said pressure nut and said seal guide assembly.

3. The seal installation tool of claim 2, further comprising:

said washer being made of a material selected from the group of materials consisting of copper and bronze for facilitating smooth movement of said seal guide assembly when turning said pressure nut.

4. The seal installation tool of claim 1, further comprising:

said seal mount portion being tubular whereby said seal mount portion is positionable to receive an end of the engine shaft such that the engine seal is positioned in the seal housing.

5. The seal installation tool of claim 1, further comprising:

said seal guide assembly having a backing portion, said seal mount portion being a cylindrical tube extending from said backing portion; and said backing portion including a groove extending around a base of said seal mount portion such that said groove is positioned to receive a protrusion extending from the engine seal.

6. The seal installing tool of claim 1, further comprising:

said seal guide assembly having a backing portion, said seal mount portion being a cylindrical tube extending from said backing portion a length less than a depth of the engine seal whereby said seal mount portion is inhibited from abutting a back wall of the seal housing while inserting the engine seal into the seal housing.

7. A seal installation system comprising:

an engine seal;

an engine having a seal housing surrounding an engine shaft;

a main screw having a distal end attachable to said engine shaft;

a pressure nut attached to said main screw and selectively movable along a length of said main screw between a head portion of the main screw and said distal end;

a seal guide assembly slidably mounted onto said main screw, said seal guide assembly having a seal mount portion, said seal mount portion being insertable through said engine seal such that said engine seal is mounted on said seal mount portion; and said pressure nut being movable against said seal guide assembly to urge said seal guide assembly towards said distal end whereby said engine seal is delivered into said seal housing;

wherein said main screw includes threading complimentary to interior threading of said engine shaft whereby said main screw is attachable to said engine shaft.

8. The seal installation system of claim 7, further comprising:

a washer positioned between said pressure nut and said seal guide assembly.

9. The seal installation system of claim 8, further comprising:

said washer being made of a material selected from a group of materials consisting of copper and bronze for facilitating smooth movement of said seal guide assembly when turning said pressure nut.

10. The seal installation system of claim 7, further comprising:

said seal mount portion being tubular whereby said seal mount portion is positionable to receive an end of said engine shaft such that said engine seal is positioned in said seal housing.

11. The seal installation system of claim 7, further comprising:

said seal guide assembly having a backing portion, said seal mount portion being a cylindrical tube extending from said backing portion; and said backing portion including a groove extending around a base of said seal mount portion such that said groove is positioned to receive a circular protrusion extending from said engine seal.

12. The seal installing system of claim 7, further comprising:

said seal guide assembly having a backing portion, said seal mount portion being a cylindrical tube extending from said backing portion a length less than a depth of said engine seal whereby said seal mount portion is inhibited from abutting a back wall of said seal housing while inserting said engine seal into said seal housing.

* * * * *